United States Patent
Kannan et al.

(10) Patent No.: US 8,886,745 B2
(45) Date of Patent: Nov. 11, 2014

(54) METHODS AND APPARATUS FOR DELIVERING AUXILIARY DATA TO DEVICE

(75) Inventors: Prasanna Kannan, San Diego, CA (US); Carlos Marcelo Dias Pazos, Carlsbad, CA (US); An Mei Chen, San Diego, CA (US); Sajith Balraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1256 days.

(21) Appl. No.: 12/419,184

(22) Filed: Apr. 6, 2009

(65) Prior Publication Data
US 2009/0254632 A1 Oct. 8, 2009

Related U.S. Application Data (60) Provisional application No. 61/043,107, filed on Apr. 7, 2008.

(51) Int. Cl.
*G06F 15/16* (2006.01)
*G06F 17/30* (2006.01)

(52) U.S. Cl.
CPC ................................ *G06F 17/3002* (2013.01)
USPC .............. 709/217; 709/203; 709/219; 725/40

(58) Field of Classification Search
USPC .................. 709/217, 203, 219; 707/695, 707; 725/37, 40, 42; 705/14.4
See application file for complete search history.

(56) References Cited

U.S. PATENT DOCUMENTS

| | | | | |
|---|---|---|---|---|
| 6,349,410 B1 * | 2/2002 | Lortz | ............................ | 725/110 |
| 7,073,193 B2 * | 7/2006 | Marsh | ............................ | 725/114 |
| 7,308,701 B1 * | 12/2007 | Kinder et al. | ................. | 725/112 |
| 7,440,445 B1 * | 10/2008 | Croak et al. | ................... | 370/352 |
| 7,653,569 B1 * | 1/2010 | Zbib | .............................. | 707/780 |
| 7,827,162 B2 * | 11/2010 | Suitts et al. | .................... | 707/707 |
| 8,051,451 B2 * | 11/2011 | Song et al. | ....................... | 725/62 |

(Continued)

FOREIGN PATENT DOCUMENTS

WO      2007134332      11/2007

OTHER PUBLICATIONS

International Search Report, PCT/US2009/039803, International Searching Authority, European Patent Office, Aug. 11, 2009.

(Continued)

*Primary Examiner* — Jimmy H Tran
(74) *Attorney, Agent, or Firm* — The Marbury Law Group, PLLC (57) ABSTRACT

Embodiments relate to systems and methods for delivering auxiliary data to a wireless or other device. Content, such as audio, video or textual content, can be hosted by a server for delivery to the device. The content can have associated resources, for example icons, barkers, intros, and outros that are associated with television programming or other media content. A metadata document can describe the set of resources or other auxiliary data associated with a service, channel or content by indicating a resource descriptor, and a URL or other associated resource locator information. The metadata document can be encoded in XML or other formats. The device can locate resources that are intended to be delivered with selected content, since links to the resources are integrated in the metadata document. From the resource descriptor, the device can also identify how a particular resource should be utilized for the service, channel or content.

39 Claims, 5 Drawing Sheets

(56) References Cited

U.S. PATENT DOCUMENTS

| | | | |
|---|---|---|---|
| 8,078,602 B2* | 12/2011 | Martin | 707/706 |
| 8,170,912 B2* | 5/2012 | Bennett et al. | 705/14.4 |
| 8,184,942 B2* | 5/2012 | Lim et al. | 386/234 |
| 8,243,562 B2* | 8/2012 | Yoo et al. | 369/30.03 |
| 8,255,413 B2* | 8/2012 | Bennett et al. | 707/766 |
| 2001/0052123 A1* | 12/2001 | Kawai | 725/36 |
| 2002/0007309 A1* | 1/2002 | Reynar | 705/14 |
| 2002/0059646 A1* | 5/2002 | Kim | 725/139 |
| 2002/0068525 A1* | 6/2002 | Brown et al. | 455/3.01 |
| 2002/0107803 A1* | 8/2002 | Lisanke et al. | 705/51 |
| 2003/0001965 A1* | 1/2003 | Cao et al. | 348/515 |
| 2003/0120593 A1* | 6/2003 | Bansal et al. | 705/39 |
| 2004/0187151 A1* | 9/2004 | Dunstan | 725/55 |
| 2004/0215733 A1* | 10/2004 | Gondhalekar et al. | 709/207 |
| 2004/0249768 A1 | 12/2004 | Kontio et al. | |
| 2005/0267798 A1* | 12/2005 | Panara | 705/14 |
| 2006/0015489 A1* | 1/2006 | Probst et al. | 707/3 |
| 2006/0251390 A1* | 11/2006 | Lim et al. | 386/95 |
| 2006/0265727 A1* | 11/2006 | Vermola | 725/56 |
| 2007/0078944 A1 | 4/2007 | Charlebois et al. | |
| 2007/0192352 A1* | 8/2007 | Levy | 707/102 |
| 2008/0040379 A1* | 2/2008 | Suitts et al. | 707/102 |
| 2008/0126515 A1* | 5/2008 | Chambers et al. | 709/218 |
| 2009/0028137 A1* | 1/2009 | Croak et al. | 370/352 |
| 2009/0055866 A1* | 2/2009 | Song et al. | 725/39 |
| 2009/0099911 A1* | 4/2009 | Ota | 705/14 |
| 2012/0002748 A1* | 1/2012 | Song et al. | 375/295 |

OTHER PUBLICATIONS

Written Opinion, PCT/US2009/039803, International Searching Authority, European Patent Office, Aug. 11, 2009.

International Preliminary Report on Patentability—PCT/US2009/039803—International Search Authority—European Patent Office, Apr. 20, 2010.

* cited by examiner

METHODS AND APPARATUS FOR DELIVERING AUXILIARY DATA TO DEVICE

CROSS-REFERENCE TO RELATED APPLICATIONS

This application is related and claims priority to U.S. Provisional Application No. 61/043,107, filed Apr. 7, 2008, assigned or under obligation of assignment to the assignee of the present application, entitled "Method and Apparatus for Delivering Auxiliary Data to Device," which provisional application is incorporated herein by reference.

BACKGROUND

Content delivery systems, such as wireless multicast platforms, can host and deliver a variety of video, audio and other content to users on a free, per-use, subscription or other basis. In the case of media delivered to mobile users over the air interface, the content can include video or audio clips delivered by a service to the handset or other device. The service in general can produce media content such as news, sports, business, weather or other video or audio programming, and make that media content available to wireless users under arrangement with the wireless carrier.

Each service and/or media content of a service can have certain auxiliary or related data associated with it. For example, a news service can have a commercial name and/or logo, such as the "BBC™" for British Broadcasting Corporation that reflects the source of the content being delivered. In the context of wirelessly broadcast media content, however, existing platforms provide no mechanism to identify and retrieve the icon or other auxiliary data resources associated with particular services or content of a service.

It may be desirable to provide improved methods and apparatus for delivering auxiliary data in content delivery systems.

DESCRIPTION OF THE DRAWINGS

The accompanying drawings, which are incorporated in and constitute a part of this specification, illustrate aspects of the present teachings and together with the description, serve to explain the principles of the present teachings. In the figures.

DETAILED DESCRIPTION

Aspects of the present teachings relate to methods and apparatus for delivering auxiliary data to a device. More particularly, aspects relate to platforms and techniques for managing and delivering auxiliary data associated with media, services, and/or program channels transmitted to a wireless mobile or other device via a content delivery system. In implementations, the auxiliary data can comprise icons, logos, clips, and/or other data identifying or associated with various content providers and material.

According to various aspects, the content delivery system can be or include a wireless content delivery system, such as the MediaFLO™ system developed by Qualcomm Inc. of San Diego, Calif. In aspects, the content delivery system can be or include a content delivery platform based on wired or optical connections, in addition to or instead of a wireless interface. In general, the content delivered by the content delivery system can include video media, such as video clips encoded in the Real™ format, the Motion Pictures Group (.mpg) format, the Windows Media format by Microsoft Corp., or other video codec or format. The content can include audio media, such as music tracks or broadcast recordings encoded in Motion Pictures Expert Group (MPEG)-1 Audio Layer 3 (MP3) format, Microsoft Corp. ".wav" format, RealAudio™ format, or other audio codec or format. The content can further include graphical, textual, and/or other content, such as streaming stock quotes, weather reports or maps, or other data.

As used at times herein, a "service" can refer to a collection of content and functions generated by a content provider or other entity, such as television organizations or broadcast radio operators. A "presentation" as used at times herein can refer to a discrete content instance that is carried or produced by a service, such as a television sitcom episode or a particular sporting event. A presentation typically has an associated title for the user in a media program guide, such as a television guide or list of streaming media. As used at times herein, "auxiliary data resources or resources" can refer to generic data entities that are related to services, presentations or other entities in a multimedia content delivery system. Resources can be used to convey additional information about entities to which they are related or linked. This additional information can also be referred to as "auxiliary data." For example, a television service can have an associated logo. It may be useful to present the logo along with titles of that service, for instance in a program guide. Resources can also be used to implement features such as barkers, intros, outros and others. Barkers are typically relatively brief clips that are presented to users to attract them to purchase a piece of content. Intros are typically also relatively brief clips that are presented before a presentation, while outros can be similarly short clips that are presented after a presentation.

According to aspects of the present teachings in one regard, platforms and techniques are provided to link generic resources that can be linked to data entities in any set of system information. "System information" as sometimes used herein can be or include the metadata describing available content in a content delivery system.

A resource linking to a data entity in system information (SI) in one regard can therefore be defined and characterized as an XML element that contains one or more descriptors, combined with a "Resource_URL". The descriptor identifies the usage of the particular resource, and the Resource_URL (i.e. resource uniform resource locator) indicates a pathway, address location or other identifier or means to locate or acquire the specified resource.

According to aspects in a further regard, platforms and techniques described herein can be used to associate and convey icons/resources to specific services in a content delivery system. For icon objects, the resource's descriptor can provide the information that the resource is designated as an icon. According to aspects, the resource descriptor can specify or be utilized for other features, such as barkers, intros, outros, or others. Methods and apparatus described herein for delivery and acquisition of resources can be used in the aforementioned MediaFLO™ broadcast network or other broadcast or multicast networks, as well as unicast networks. According to aspects in one regard, the mechanism of acquiring a resource (whether in unicast, multicast, broadcast, and/or other environments) can be based on the semantics of the embedded Resource_URL integrated in the descriptor document.

Reference will now be made in detail to exemplary aspects of the present teachings, which are illustrated in the accompanying drawings. Where possible the same reference numbers will be used throughout the drawings to refer to the same or like parts.

Figure 1:
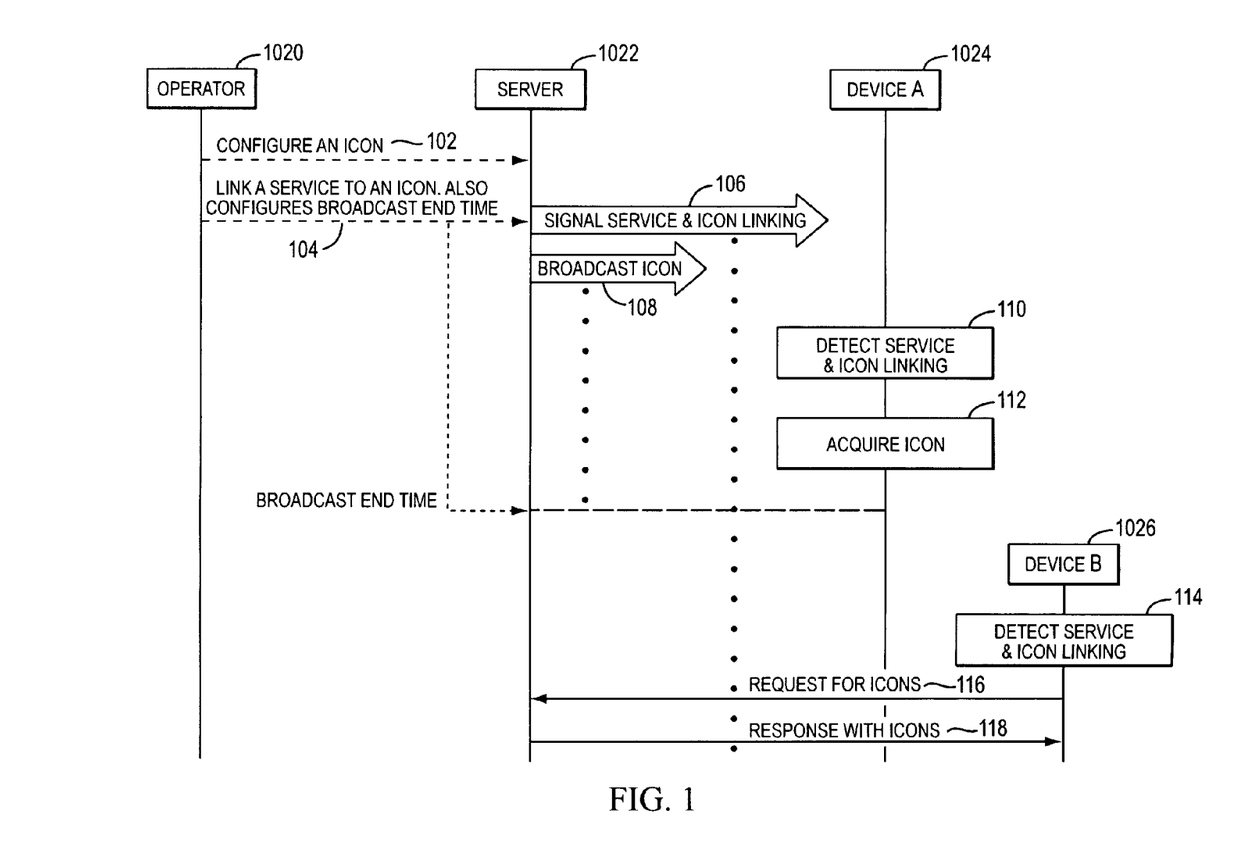
FIG. 1 illustrates a flow diagram for delivery of icons to a device, according to various aspects of the present teachings.

FIG. 1 illustrates an overall flow diagram for delivery of auxiliary data to a device, according to aspects. In 102, an operator 1020 and/or media delivery entity can configure an icon resource and deliver that resource to a delivery server 1022, such as a server associated with a wireless base station. In 104, the operator 1020 or media delivery entity can link a service to the icon, for instance by recording a link in a metadata document. The operator 1020 or media delivery entity can also configure a broadcast end time to indicate the termination time for content to be broadcast to wireless or other devices.

In 106, the delivery server 1022 can transmit a signal to a set of one or more devices, illustratively referred to as "device A", to indicate that the icon and service have been linked. In implementations, device A 1024 can be a cellular telephone, a network-enabled personal digital assistant, a portable network-enabled media player, and/or other client, machine, or device. In 108, the delivery server 1022 can broadcast the icon to a set of devices including device A 1024. In 110, device A 1024 or other devices can receive the signal and detect the linkage between the service and icon. In 112, device A 1024 or other devices can acquire the icon, for instance by downloading from a location specified by a Resource_URL in the metadata (SI) document. After expiration of the broadcast end time, according to aspects, the icon broadcast is stopped.

In 114, a second device or devices, illustratively referred to as "Device B", is powered up and can detect the linkage between the service and icon. In 116, since the icon is not broadcast, device B 1026 can transmit a unicast request for the icon(s) associated with the service to the delivery server 1022. In 118, the delivery server 1022 can transmit a response to the request from device B 1026 with the identified icon(s), as appropriate.

Figure 2:
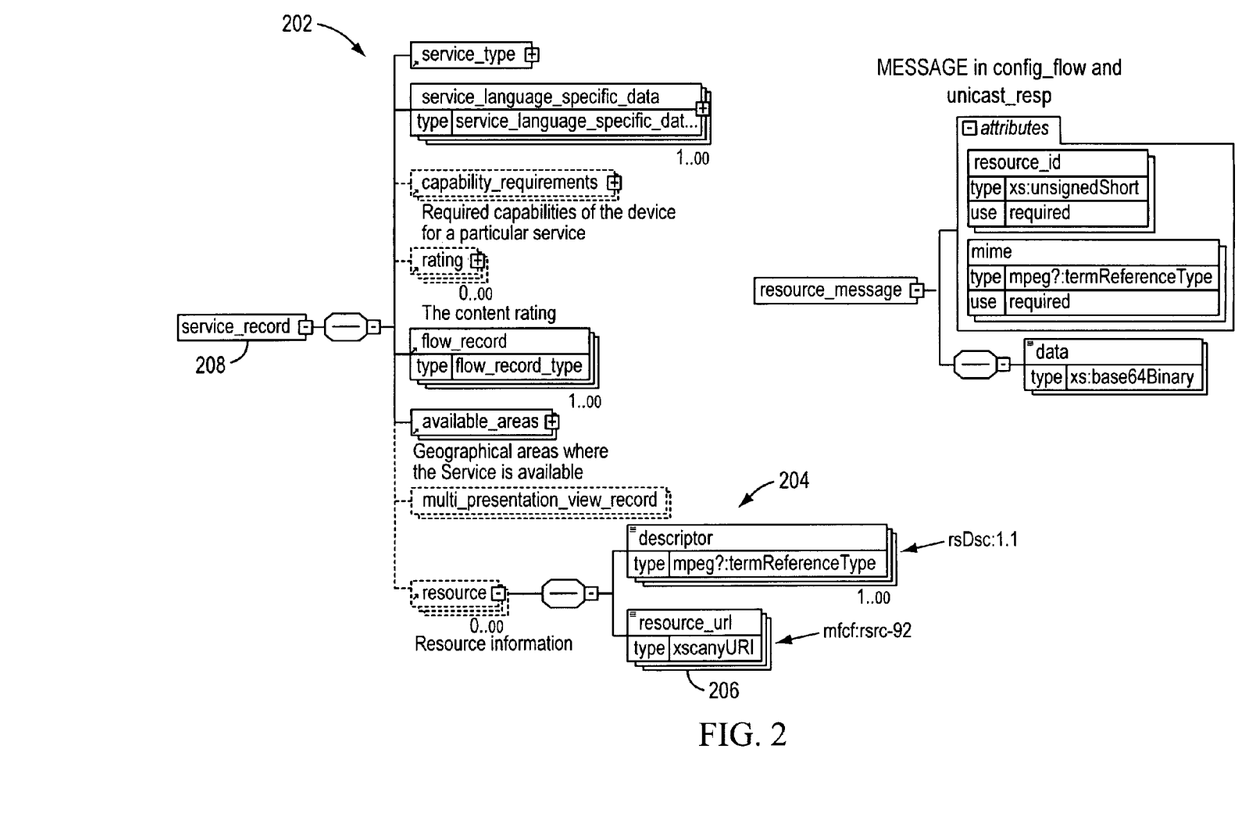
FIG. 2 illustrates a schema for a metadata document that links service to an icon/resource in a metadata document, as well as a schema for a resource_message document that contains the resource data, according to various aspects.

FIG. 2 illustrates an XML schema 202 that can be used as a template for a XML meta-data document that can be used to associate services and resources, according to various aspects. The service record 208 element identifies a service present to provide content in a wireless or other content delivery network. The resource descriptor element 204, characterizes the type of the resource. The resource_URL 206 provides the address, location or identification of the resource itself. In embodiments, that resource can be a service icon, and/or other resources. It may be noted that while the association of available resources and the sources of those sources is illustrated in terms of an XML-based data schema 202, in implementations resources and their associated sources can be encoded in other formats, languages, or data structures.

Figure 3:
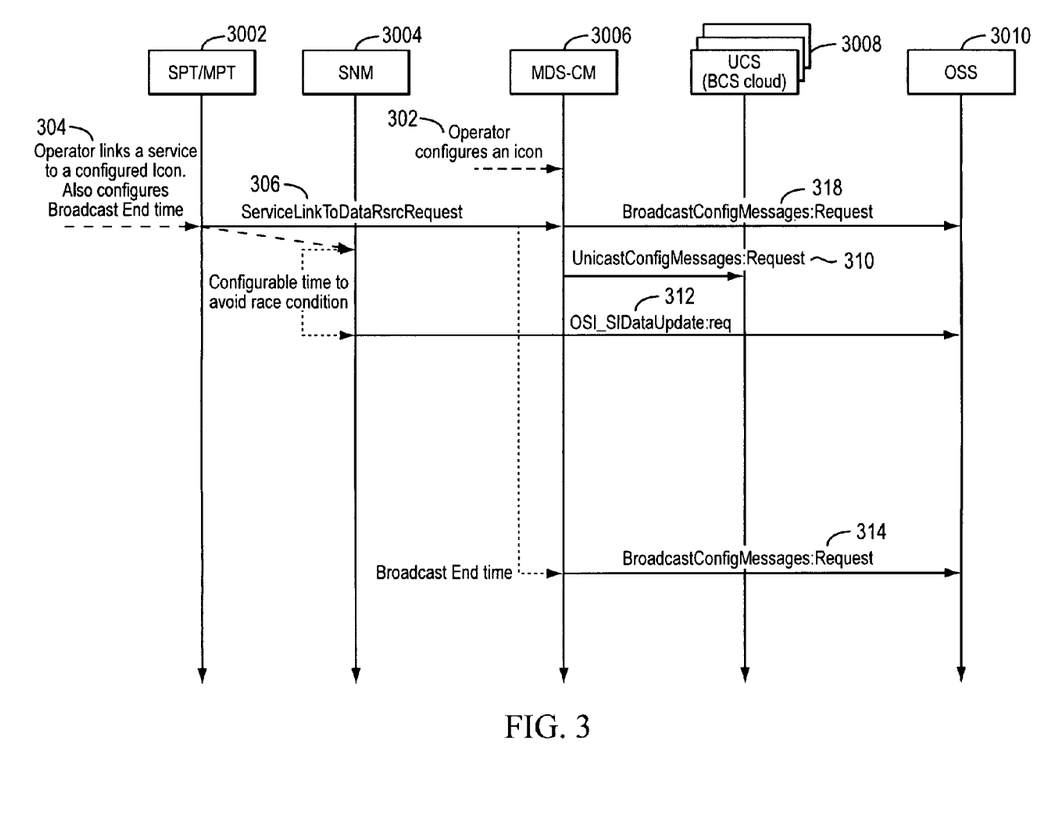
FIG. 3 illustrates a flow diagram of server processing to link an icon/resource to a service and deliver the resource, according to various aspects.

FIG. 3 illustrates a flow diagram of content delivery processing on a delivery server in a content delivery system, according to various aspects. The processing illustrated in FIG. 3 can in one regard apply to the delivery of service icon resources under the aforementioned MediaFLO.TM. system. In 302, an operator 3002 and/or media delivery entity can configure an icon or other resource. In 304, the operator or media delivery entity can link a service, channel or content to a configured icon. In 306, a message to associate a service and icon and/or other resources, such as a "ServiceLink ToDataRsrcRequest" message, can be generated and transmitted to an MDS-CM module (media delivery system-content management) module 3006. In 318, a message to configure broadcast of icon and/or other resource data such as a "BroadcastConfigMessages.Request" message can be transmitted to an OSS (overhead signaling server) module 3010. In 310, a message to prepare unicast delivery of icon and/or resource data such as a "UnicastConfigMessages.Request" message can be transmitted to a UCS (unicast configuration server) module 3008 present within the billing and customer service (BCS) infrastructure cloud. In 312, a message to update broadcast metadata such as an "OSI_SIDataUpdate.req" message can be transmitted to the OSS module 3010. In 314, a BroadcastConfigMessages.Request or other broadcast configuration message can be transmitted to the OSS module 4010 at the broadcast end time to indicate end of broadcast of icon and/or resource data. Other messages and sequences are possible.

Figure 4:
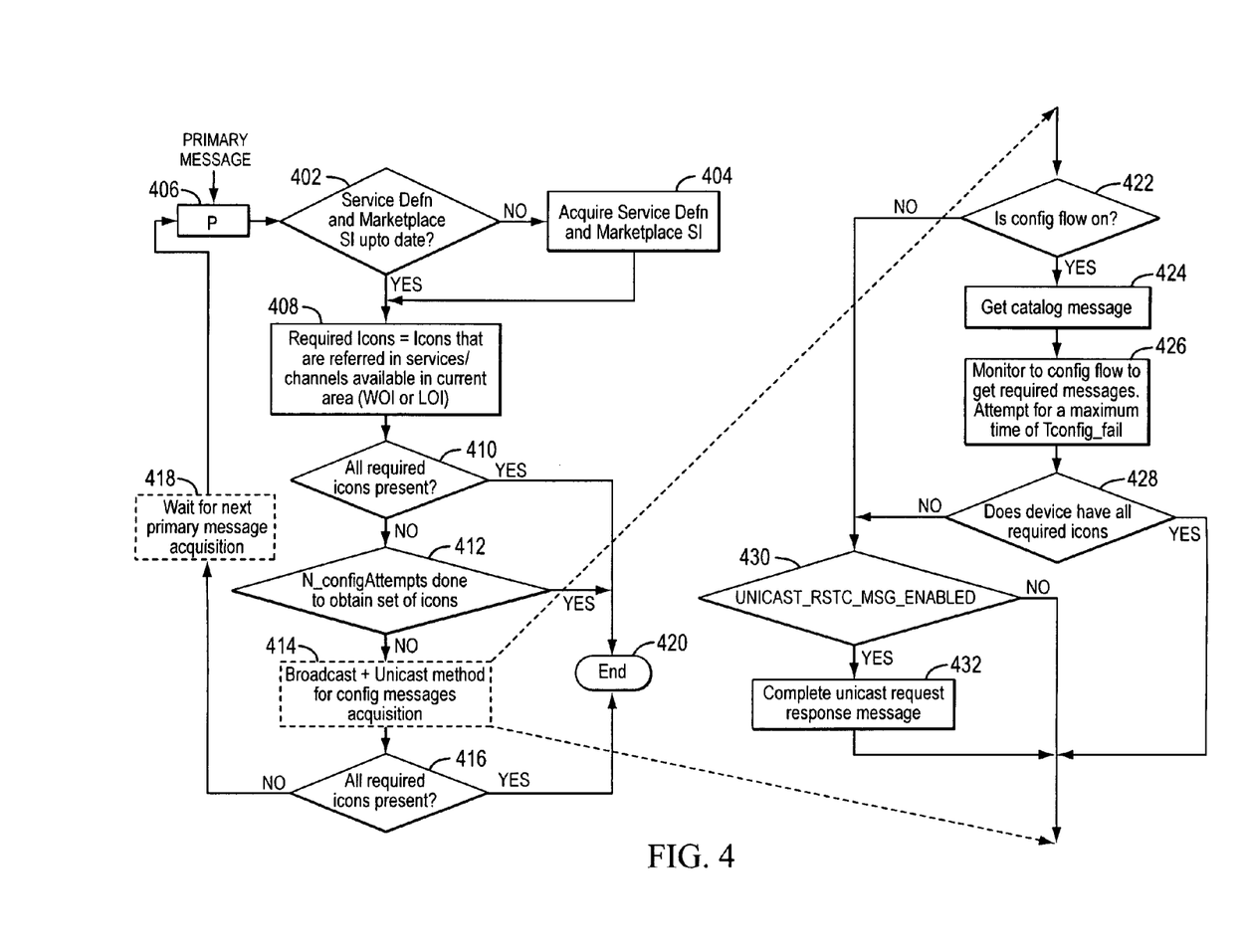
FIG. 4 illustrates a flowchart of device behavior during configuration message acquisition, according to various aspects.

FIG. 4 illustrates a flow diagram for processing in a device, such as a cellular handset, to receive and manipulate icons and/or other resources associated with services, channels or content. Primary message acquisition 406 can be performed according to systems and techniques described in co-pending U.S. application Ser. No. 11/734,656 filed Apr. 12, 2007, entitled "Apparatus and Methods for Communicating System State Information Change to Wireless Devices," by An M. Chen and Prasanna Kannan, which application is incorporated by reference herein. In 402, based on primary message data, a determination can be made whether the service definition and marketplace SI (system information) is up to date. If the determination of 402 is no, processing proceeds to 404 where a current service definition and marketplace SI information are acquired. Processing then proceeds to 408.

If the determination of 402 is yes, processing proceeds to 408 where required icons are identified as those icons that are referred in services or channels available in the current area of the device (wide area operation infrastructure and/or local area operation infrastructure, WOI or LOI). In 410, a determination can be made whether all required icons are present. If the determination of 410 is yes, processing proceeds to 420 where processing can end. If the determination of 410 is no, processing proceeds to 412 where a determination is made whether a defined number of attempts, illustratively referred to as "N_configAttemtps", have been made to acquire this set of required icons. If the determination of 412 is yes, processing can proceed to 420 where processing can end. If the determination of 412 is no, processing proceeds to 414 where a broadcast and unicast method for configuration messages acquisition can be executed, for instance according to 422-432 described below. In 416, a determination is made whether all required icons are present. If the determination of 416 is yes, processing can proceed to 420 where processing can end. If the determination of 416 is no, processing can proceed to 418 where a wait state can be entered to wait for the next primary message acquisition. After any wait state, processing proceeds to 406 where a primary message is acquired, after when processing returns to 402.

In implementations, the processing of 414 can be carried out according to 422-432. In 422, a determination can be made whether data is sent in a broadcast flow named or referred to as configuration flow. If the determination of 422 is yes, processing can proceed to 424 where a catalog message can be acquired. Catalog message indicates the information on all the messages that will be broadcast in configuration flow. In 426, the device can listen to or monitor the configuration flow to acquire any required messages. The device can continue to monitor for a maximum time, defined by a field "Tconfig_fail". In 428, a determination can be made whether the device has all required icons. If the determination of 428 is yes, processing can return to 416 as described above. If the determination of 428 is no, processing can proceed to 430 in which a determination can be made whether a unicast configuration request response transaction can be done, such as a "UNICAST_RSRC_MSG_ENABLED" field being enabled. If the determination of 430 is yes, processing can proceed to 432 where a unicast request response message can be completed. If the determination of 430 is no, processing can return to 416 as described above. Other processing steps and sequences can be used.

Figure 5:
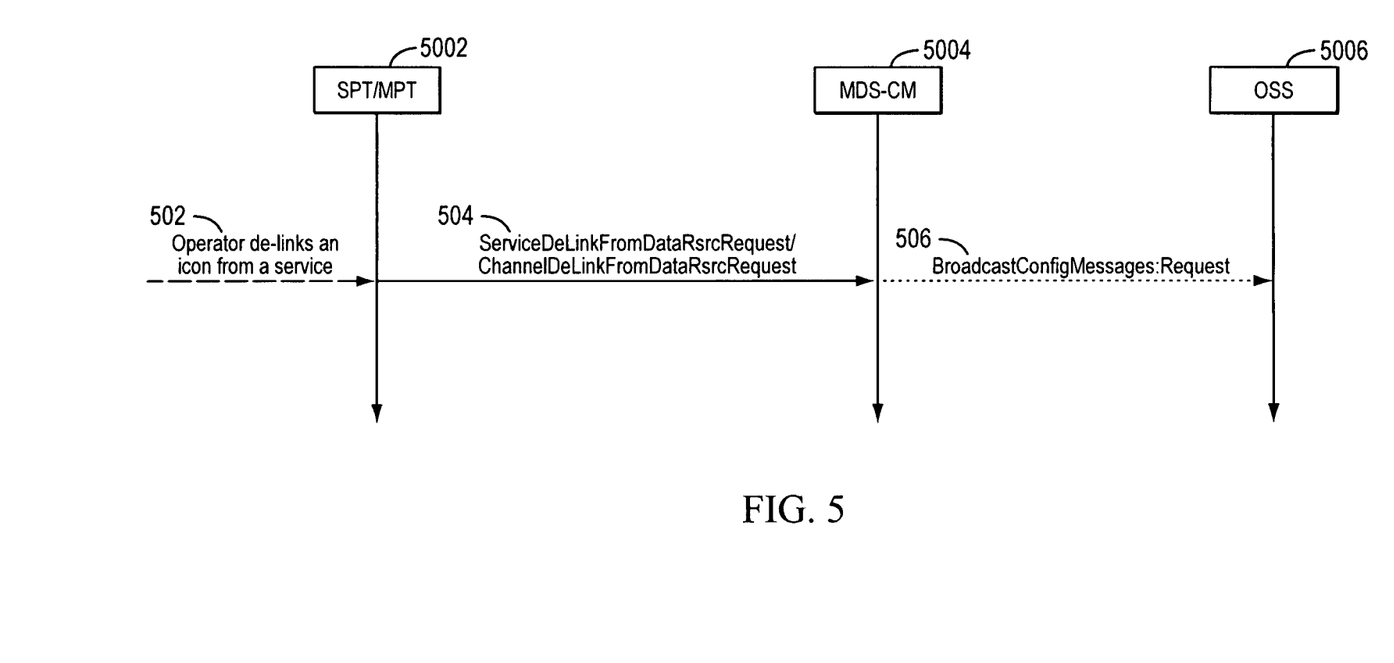
FIG. 5 illustrates a flow diagram of a process to de-link an icon/resource form a service and stop delivery of the resource, according to various aspects.

FIG. 5 illustrates a flow diagram for processing related to the de-linking of an icon or other resource from a service, channel or content. In 502, an operator or media delivery entity can de-link or delete an icon from a service, channel or content, for example by updating a metadata document (SI). In implementations, the operator and/or service can utilize the SPT/MPT (Service Provisioning Tool/MarketPlace Provisioning Tool) module 5002 for the initiation of the de-linking action. In 504, a message can be transmitted to the MDS-CM (MediaFLO™ Distribution Subsystem-Configuration Management) MediaFLO™ module 5004, for example in the form of a "ServiceDeLinkFrmDataRsrcRequest" or a "ChannelDeLinkFrmDataRsrsRequest" message, notifying that module of the initiation of the de-linking action. In 506, a configuration message can be transmitted to the OSS module 5006 in the form of a "BroadcastConfigMessages.Request" notifying that module of the de-linking action. As a result, if no other services or channels are linked to an icon or other resource, the MDS-CM module 5004 will stop broadcasting the icon/data_resource. As part of the termination of the broadcast of icon/data_resource, an OSS message from MDS-CM can be sent for removing that icon/data_resource and updating catalog information. Other steps and sequences are possible.

It may be noted that in implementations, icon resources or other content can be delivered to the recipient device via other delivery mechanisms than those, for example, generally illustrated in FIGS. 4-6, which can be referred to as "overhead flow" delivery mechanisms. In implementations, it is in addition or instead possible to deliver icon resources to the recipient device in the form of data files or objects communicated directly or indirectly from a content server, or other source. In implementations, the icon resources and/or other resources can be formatted as graphical files, HTML files, XML files, and/or other files, formats, objects, or data structures. The encoding of icon and/or other resources as explicit data files or objects can be advantageous, for example, when the data size of the icon or other content is relatively large, such as on the order of a megabyte, or greater or lesser sizes. In implementations, icon or other resources encoded as explicit data files or objects can be transmitted more efficiently than using overhead flow based transfer mechanisms, in one regard because the resource data can be serialized and transmitted with less messaging overhead. In implementations, icons and/or other resources or content can be delivered via other mechanisms, as well.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more exemplary implementations, the functions described may be implemented in hardware, software, firmware, or any combination thereof. If implemented in software, the functions may be stored on as one or more instructions or code on a non-transitory computer-readable medium. A non-transitory storage media may be any available non-transitory media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media. The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For further example, while implementations have been described in which media content is served via a wireless content delivery system, in implementations a content delivery platform that in addition or instead uses a wired or optical network for delivery of media can also be used. For further example, while implementations have been described using XML schema that associates the set of resources and corresponding resource descriptors and Resource_URLs for a single service, it is possible to associate a resource with multiple services and/or channels. Yet further, while implementations have described the metadata document template using XML schema, in implementations can describe metadata document template or syntax using other metadata definition methods. Other resources described as singular or integrated can in implementations be plural or distributed, and resources described as multiple or distributed can in implementations be combined. The scope of the invention is accordingly intended to be limited only by the following claims.

What is claimed is:

1. A method of delivering auxiliary data resource associated with a service, channel or content to a device, the service, channel or content being delivered to the device by at least one of multicast and broadcast, the method comprising:
   associating at least one auxiliary data resource with at least one of the service, channel and content via a metadata document, the association in the metadata document comprising at least a resource descriptor that identifies a usage of the at least one auxiliary data resource and a reference to resource locator information for acquiring the at least one auxiliary data resource;
   configuring a broadcast end time to indicate a termination time for the at least one service, channel and content to be broadcast to the device;
   transmitting, on a first flow, a signal indicating the association between the at least one auxiliary data resource and the at least one of the service, channel and content, to the device, the signal including a location specified in the resource locator information;
   determining whether the broadcast end time has elapsed; and
   transmitting, on a second flow different than the first flow, the at least one auxiliary data resource to the device from the location specified in the resource locator information as long as it is determined that the broadcast time has not elapsed,
   wherein the resource locator information comprises multiple alternative pathways to access the associated at least one auxiliary data resource.

2. The method of claim 1, wherein the content comprises at least one of video content, audio content, and textual content and the at least one auxiliary data resource comprises at least one of an icon, a barker clip, an intro clip, and an outro clip.

3. The method of claim 1, wherein the device comprises at least one of a cellular telephone, a network-enabled personal digital assistant, and a portable network enabled media player.

4. The method of claim 1, wherein the metadata document comprises an XML (extensible markup language) document.

5. The method of claim 1, wherein the resource locator information comprises at least one URL (uniform resource locator) identifying a location of the associated at least one auxiliary data resource.

6. The method of claim 1, wherein transmitting of the at least one auxiliary data resource is performed via at least one of an overhead flow mechanism and a data file delivery mechanism.

7. The method of claim 1, further comprising:
   transmitting the at least one auxiliary data resource to the device over a unicast network in response to receiving a delivery request from the device.

8. A server for transmitting auxiliary data associated with a service, channel or content to a device, the service, channel or content being delivered to the device by at least one of multicast and broadcast, the server comprising:
   a processor;
   a memory;
   a communication interface coupled to the processor, wherein the processor executes software instructions stored in the memory to perform operations comprising:
      associating at least one auxiliary data resource with at least one of the service, channel and content via a metadata document, the association in the metadata document comprising at least a resource descriptor that identifies a usage of the at least one auxiliary data resource and a reference to resource locator information for acquiring the at least one auxiliary data resource;
      configuring a broadcast end time to indicate a termination time for the at least one service, channel and content to be broadcast to the device;
      transmitting on a first flow, a signal indicating the association between the at least one auxiliary data resource and the at least one of the service, channel and content, to the device, the signal including a location specified in the resource locator information;
      determining whether the broadcast end time has elapsed; and
      transmitting, on a second flow different from the first flow, the at least one auxiliary data resource to the device from the location specified in the resource locator information as long as it is determined that the broadcast time has not elapsed,
      wherein the resource locator information comprises multiple alternative pathways to access the associated at least one auxiliary data resource.

9. The server of claim 8, wherein the content comprises at least one of video content, audio content, and textual content and the at least one auxiliary data resource comprises at least one of an icon, a barker clip, an intro clip, and an outro clip.

10. The server of claim 8, wherein the communication interface comprises a wireless interface and the device comprises at least one of a cellular telephone, a network-enabled personal digital assistant, and a portable network-enabled media player.

11. The server of claim 8, wherein the metadata document comprises an XML (extensible markup language) document.

12. The server of claim 8, wherein the resource locator information comprises at least one URL (uniform resource locator) identifying a location of the associated at least one auxiliary data resource.

13. The server of claim 8, wherein the transmitting of the at least one auxiliary data resource is performed via at least one of an overhead flow mechanism and a data file delivery mechanism.

14. The server of claim 8, wherein the processor is configured with software instructions to perform operations further comprising;
   transmitting the at least one auxiliary data resource to the device over a unicast network in response to receiving a delivery request from the device.

15. A non-transitory computer-readable storage medium having stored thereon software instructions configured to, when executed by a processor, the processor perform operations that cause a transmission of auxiliary data associated with a service, channel or content to a device, the service, channel or content being delivered to the device by at least one of multicast and broadcast, the operations comprising:
   associating at least one auxiliary data resource with at least one of the service, channel and content via a metadata document, the association in the metadata document comprising at least a resource descriptor that identifies a usage of the at least one auxiliary data resource and a reference to resource locator information for acquiring the at least one auxiliary data resource, wherein the resource locator information comprises multiple alternative pathways to access the associated at least one auxiliary data resource;
   configuring a broadcast end time to indicate a termination time for the at least one service, channel and content to be broadcast to the device;

transmitting, on a first flow, a signal indicating the association between the at least one auxiliary data resource and the at least one of the service, channel and content, to the device, the signal including a location specified in the resource locator information;

determining whether the broadcast end time has elapsed; and transmitting, on a second flow different than the first flow, the at least one auxiliary data resource to the device from the location specified in the resource locator information and as long as it is determined that the broadcast time has not elapsed.

16. The non-transitory computer-readable storage medium of claim 15, wherein the content comprises at least one of video content, audio content, and textual content and the at least one auxiliary data resource comprises at least one of an icon, a barker clip, an intro clip, and an outro clip.

17. The non-transitory computer-readable storage medium of claim 15, wherein the device comprises at least one of a cellular telephone, a network-enabled personal digital assistant, and a portable network-enabled media player.

18. The non-transitory computer-readable storage medium of claim 15, wherein the metadata document comprises an XML (extensible markup language) document.

19. The non-transitory computer-readable storage medium of claim 15, wherein the resource locator information comprises at least one URL (uniform resource locator) identifying a location of the associated at least one auxiliary data resource.

20. The non-transitory computer-readable storage medium of claim 15 wherein the stored software instructions are configured to cause a processor to perform operations further comprising:

transmitting the at least one auxiliary data resource or content via at least one of an overhead flow mechanism and a data file transmission mechanism.

21. The non-transitory computer-readable storage medium of claim 15, wherein the stored software instructions are configured to cause a processor to perform operations further comprising transmitting the at least one auxiliary data resource to the device over a unicast network in response to receiving a delivery request from the device.

22. A method of receiving auxiliary data resource associated with a service, channel or content in a device, the service, channel or content being transmitted to the device by at least one of multicast and broadcast, the method comprising:

receiving, on a first flow, a signal indicating an association between at least one auxiliary data resource and at least one of the service, channel and content via a metadata document, the association in the metadata document comprising at least a resource descriptor that identifies a usage of the at least one auxiliary data resource and a location specified in resource locator information for acquiring the at least one auxiliary data resource;

monitoring a second flow different from the first flow for a predetermined period of time, wherein the predetermined period of time indicates a termination time for the at least one service, channel and content to be broadcast to the device;

determining whether the at least one auxiliary data resource is received via the second flow from the location specified in the resource locator information; and transmitting a unicast request for delivery of the at least one auxiliary data resource when it is determined that the at least one auxiliary data resource is not received within the predetermined period of time.

23. The method of claim 22, wherein the content comprises at least one of video content, audio content, and textual content and the at least one auxiliary data resource comprises at least one of an icon, a barker clip, an intro clip, and an outro clip.

24. The method of claim 22, wherein the device comprises at least one of a cellular telephone, a network-enabled personal digital assistant, and a portable network-enabled media player.

25. The method of claim 22, wherein the metadata document comprises an XML (extensible markup language) document.

26. The method of claim 22, wherein the resource locator information comprises at least one URL (uniform resource locator) identifying the location.

27. The method of claim 22, wherein the receiving the at least one auxiliary data resource comprises receiving via at least one of an overhead delivery mechanism and a data file delivery mechanism.

28. A device, the device being configured to receive auxiliary data associated with a service, channel or content, the service, channel or content being transmitted to the device by at least one of multicast and broadcast, the device comprising:

an interface to a delivery server; and a processor and a memory, communicating with the interface, wherein the processor executes software instructions stored in the memory to perform operations comprising:

receiving, on a first flow, a signal indicating an association between at least one auxiliary data resource and at least one of the service, channel and content via a metadata document, the association in the metadata document comprising at least a resource descriptor that identifies a usage of the at least one auxiliary data resource and a location specified in resource locator information for acquiring the at least one auxiliary data resource;

monitoring a second flow different from the first flow for a predetermined period of time, wherein the predetermined period of time indicates a termination time for the at least one service, channel and content to be broadcast to the device;

determining whether the at least one auxiliary data resource is received via the second flow from the location specified in the resource locator information; and transmitting a unicast request for delivery of the at least one auxiliary data resource when it is determined that the at least one auxiliary data resource is not received within the predetermined period of time.

29. The device of claim 28, wherein the content comprises at least one of video content, audio content, and textual content and the at least one auxiliary data resource comprises at least one of an icon, a barker clip, an intro clip, and an outro clip.

30. The device of claim 28, wherein the interface comprises a wireless interface and the device comprises at least one of a cellular telephone, a network-enabled personal digital assistant, and a portable network-enabled media player.

31. The device of claim 28, wherein the metadata document comprises an XML (extensible markup language) document.

32. The device of claim 28, wherein the resource locator information comprises at least one URL (uniform resource locator) identifying the location.

33. The device of claim 28, wherein the processor is configured with software instructions to perform operations further comprising receiving the at least one auxiliary data resource via at least one of an overhead delivery mechanism and a data file delivery mechanism.

34. A non-transitory computer-readable storage medium having stored thereon software instructions configured to, when executed by a processor of a device, the processor performs operations comprising:
receiving, on a first flow, a signal indicating an association between at least one auxiliary data resource and at least one of a service, channel and content via a metadata document, the association in the metadata document comprising at least a resource descriptor that identifies a usage of the at least one auxiliary data resource and a location specified in resource location information for acquiring the at least one auxiliary data resource;
monitoring a second flow different from the first flow for a predetermined period of time, wherein the predetermined period of time indicates a termination time for the at least one service, channel and content to be broadcast to the device;
determining whether the at least one auxiliary data resource is received via the second flow from the location specified in resource locator information; and
transmitting a unicast request for delivery of the at least one auxiliary data resource when it is determined that the at least one auxiliary data resource is not received within the predetermined period of time.

35. The non-transitory computer-readable medium of claim 34, wherein the content comprises at least one of video content, audio content and textual content and the at least one auxiliary data resource comprises at least one of an icon, a barker clip, an intro clip, and an outro clip.

36. The non-transitory computer-readable medium of claim 34, wherein the device comprises at least one of a cellular telephone, a network-enabled personal digital assistant, and a portable network-enabled media player.

37. The non-transitory computer-readable medium of claim 34, wherein the metadata document comprises an XML (extensible markup language) document.

38. The non-transitory computer-readable medium of claim 34, wherein the resource locator information comprises at least one URL (uniform resource locator) identifying the location.

39. The non-transitory computer-readable medium of claim 34 wherein the stored software instructions are configured to cause a processor to perform operations further comprising: receiving the at least one auxiliary data resource via at least one of an overhead delivery mechanism and a data file delivery mechanism.

* * * * *